United States Patent
Hars

(10) Patent No.: US 9,436,594 B2
(45) Date of Patent: Sep. 6, 2016

(54) WRITE OPERATION WITH IMMEDIATE LOCAL DESTRUCTION OF OLD CONTENT IN NON-VOLATILE MEMORY

(75) Inventor: Laszlo Hars, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 508 days.

(21) Appl. No.: 13/117,873

(22) Filed: May 27, 2011

(65) Prior Publication Data

US 2012/0303865 A1    Nov. 29, 2012

(51) Int. Cl.
*G06F 12/00* (2006.01)
*G06F 12/02* (2006.01)

(52) U.S. Cl.
CPC .... *G06F 12/0246* (2013.01); *G06F 2212/7201* (2013.01); *G06F 2212/7207* (2013.01)

(58) Field of Classification Search
CPC .... G06F 3/0647; G06F 3/067; G06F 3/0605; G06F 3/061; G06F 3/0689; G06F 2/0605; G06F 3/0679; G06F 12/0246; G06F 2212/7205; G06F 21/79; G06F 2221/2143
USPC .................................................. 711/165, 103
See application file for complete search history.

(56) References Cited

U.S. PATENT DOCUMENTS

| | | | | |
|---|---|---|---|---|
| 5,544,119 | A * | 8/1996 | Wells et al. | 365/185.11 |
| 6,026,017 | A * | 2/2000 | Wong et al. | 365/185.05 |
| 6,836,432 | B1 * | 12/2004 | Parker et al. | 365/185.03 |
| 7,003,621 | B2 | 2/2006 | Koren et al. | |
| 7,089,350 | B2 * | 8/2006 | Koren et al. | 711/103 |
| 7,475,203 | B1 | 1/2009 | Petrillo, Jr. et al. | |
| 7,581,118 | B2 * | 8/2009 | McGovern | 713/193 |
| 7,739,315 | B2 | 6/2010 | Haga | |
| 2009/0296475 | A1 * | 12/2009 | Hemink et al. | 365/185.17 |
| 2010/0211737 | A1 * | 8/2010 | Flynn et al. | 711/114 |
| 2010/0250835 | A1 * | 9/2010 | Paddon et al. | 711/103 |
| 2010/0262721 | A1 * | 10/2010 | Asnaashari et al. | 710/5 |
| 2010/0318839 | A1 * | 12/2010 | Avila et al. | 714/5 |
| 2011/0055458 | A1 * | 3/2011 | Kuehne | 711/103 |

* cited by examiner

*Primary Examiner* — Charles Rones
*Assistant Examiner* — Nancy Wong
(74) *Attorney, Agent, or Firm* — Hall Estill Attorneys at Law

(57) ABSTRACT

Method and apparatus for writing data to a non-volatile memory device, such as a solid state drive (SSD). In accordance with various embodiments, a host write command is serviced by writing a newer copy of user data to a first selected empty physical location in a non-volatile memory, and by concurrently overwriting an older copy of said user data previously stored to a different, second selected occupied physical location of the non-volatile memory.

19 Claims, 4 Drawing Sheets

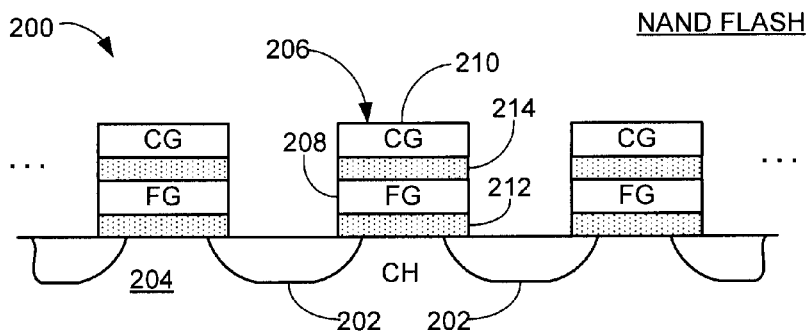
FIG. 7
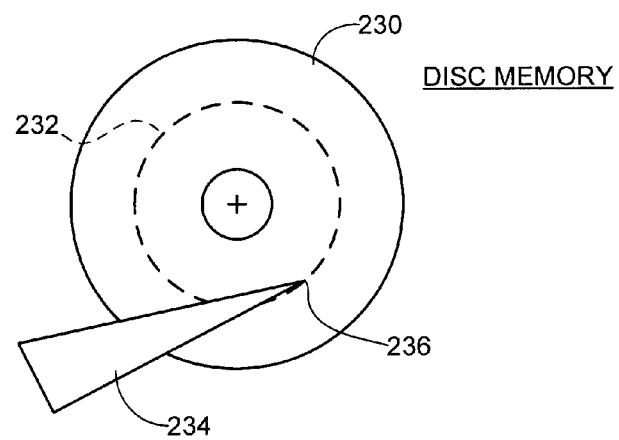
FIG. 8
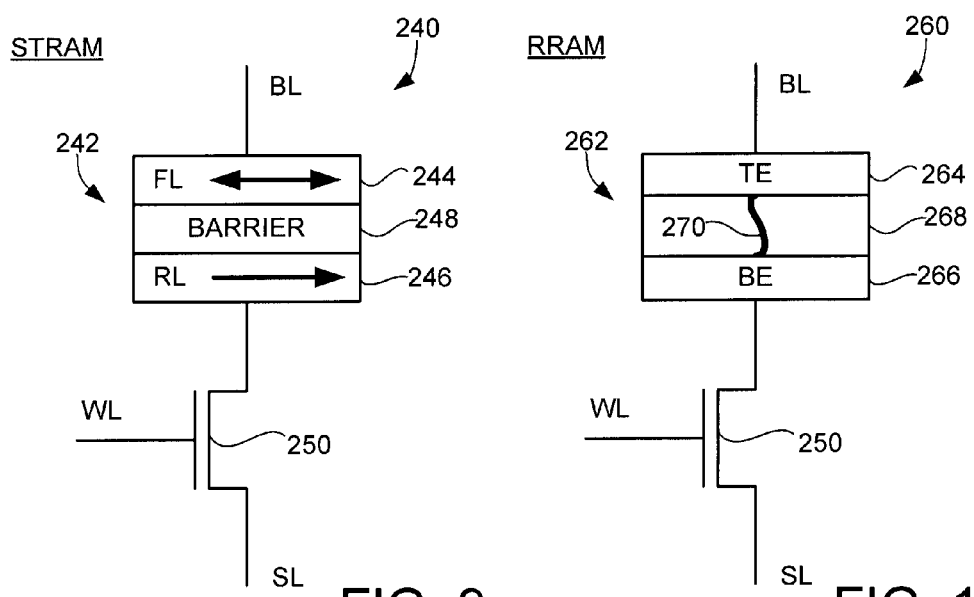
FIG. 9
FIG. 10

WRITE OPERATION WITH IMMEDIATE LOCAL DESTRUCTION OF OLD CONTENT IN NON-VOLATILE MEMORY

SUMMARY

Various embodiments of the present invention are generally directed to a method and apparatus for writing data to a non-volatile memory device, such as a solid state drive (SSD).

In accordance with various embodiments, a host write command is serviced by writing a newer copy of user data to a first selected empty physical location in a non-volatile memory, and by concurrently overwriting an older copy of said user data previously stored to a different, second selected occupied physical location of the non-volatile memory. In some embodiments, a mapping table entry may be updated which translates logical address to physical address of the user data in the non-volatile memory.

These and other features and aspects which characterize the various embodiments of the present invention can be understood in view of the following detailed discussion and the accompanying drawings.

BRIEF DESCRIPTION OF THE DRAWINGS

FIG. 7 illustrates flash memory cells adapted for use in the memory of FIG. 1.

FIG. 8 shows a rotatable medium adapted for use in the memory of FIG. 1.

FIG. 9 provides a spin-torque transfer random access memory (STRAM) cell adapted for use in the memory of FIG. 1.

FIG. 10 shows a resistive random access memory (RRAM) cell adapted for use in the memory cell of FIG. 1.

DETAILED DESCRIPTION

The present disclosure generally relates to data storage, and in particular to methods and devices that may be used to manage the storage of data in a data storage device.

Data storage devices generally operate to store blocks of data in memory. The devices can employ data management systems to track the physical locations of the blocks so that the blocks can be subsequently retrieved responsive to a read request for the stored data. Some types of data storage devices, such as but not limited to solid state drives (SSDs), can be arranged to write data to a new available location each time a block is presented for writing. Over time, a situation may arise where several versions of a given block of user data may persist in memory, with one of the versions being the most current data and the remaining versions being stale data, which can be an older version of the block, or another copy of the current version.

Metadata can be generated and maintained to track the locations and status of the stored data. Such metadata tracks the relationship between logical elements (such as logical block addresses, LBAs) stored in the memory space and physical locations (such as physical block addresses, PBAs) of the memory space.

It may be desirable from time to time to sanitize the memory to remove all copies (including older revisions) of a particular data set. Such sanitizing operations can be resource intensive, as an extended search may be required to locate and erase each of the prior (stale) copies of the data set from the memory. As the total number of copies increases, the likelihood increases that less than all of the data in the system will be effectively erased. This can allow a motivated unauthorized party to recover previously stored data from the device, as well as to obtain other information relating to the system, such as file management structures, encryption systems, the use of data compression, and so on.

Accordingly, various embodiments of the present invention are generally directed to a method and apparatus for managing data in a non-volatile memory. As explained below, a host write command is serviced by writing a newer copy of user data to a first selected empty physical location in a non-volatile memory and by concurrently overwriting an older copy of said user data previously stored to a different, second selected occupied physical location in the non-volatile memory. In this way, there will generally only be one copy of any particular data set in the memory at a time. This may serve to enhance data security and improve the efficiency of special data sanitizing operations.

Figure 1:
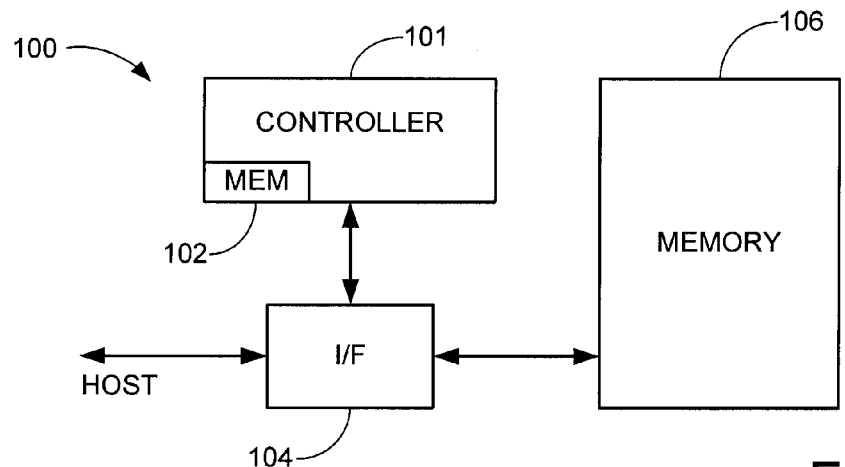
FIG. 1 is a block diagram for a data storage device.

These and various other aspects of the present disclosure can be understood from a review of the drawings, beginning with FIG. 1 which illustrates an exemplary data storage device 100. For purposes of the present discussion, the device 100 will be characterized as a solid state drive (SSD) that utilizes NAND flash memory to provide non-volatile storage of user data from a host device. It will be appreciated that other forms of storage devices can be utilized, so FIG. 1 is merely exemplary and not limiting.

A programmable controller 101 uses programming in local memory 102 to provide top level control of the device 100. The controller coordinates commands and data transfers with the host through an interface (I/F) 104. The I/F includes data buffering and back end processing capabilities to facilitate data transfers with a main memory 106.

Figure 2:
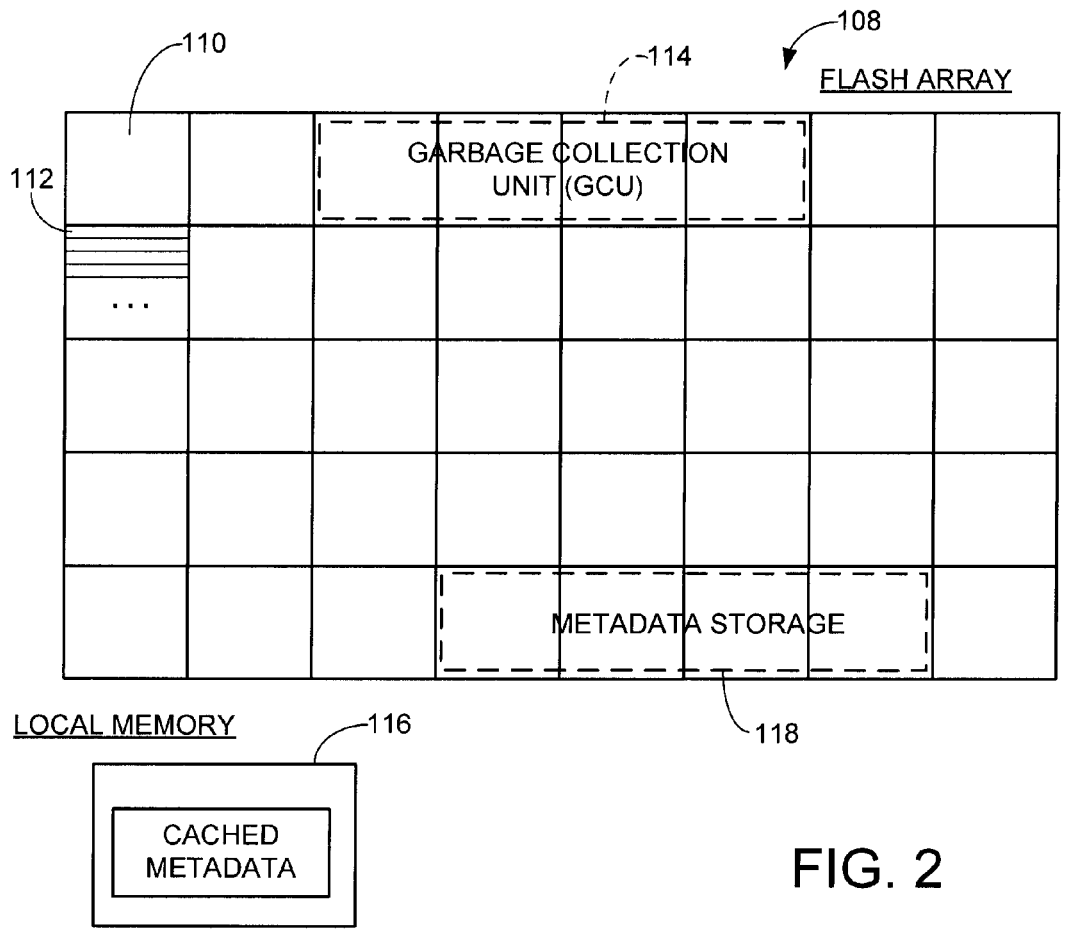
FIG. 2 illustrates a memory structure of the device of FIG. 1.

FIG. 2 shows one embodiment of the main memory of FIG. 1. A flash array 108 is arranged into relatively large erasure blocks 110 which are individually erasable prior to allocation. Each block 110 includes a number of pages 112 of fixed size memory. In some embodiments, each page constitutes a row of flash memory cells coupled to a common word line. Read and write operations can take place on a page-by-page basis.

The pages can be referred to as mapping units and represent smaller units of memory to which data are concurrently written during write operations (although some units can be configured to accept partial mapping unit writes). These may be on the order of 4 KB-8 KB in size. The larger erasure blocks are erased as a unit using a voltage reversal technique and may be significantly larger, such as on the order of about 256 KB-2 MB in size. The erasure blocks 110 may be arranged on different chips, dies, layers, etc. Garbage collection units (GCUs) 114 can be formed from a selected number of blocks 110 which are allocated and erased as a unit.

FIG. 2 further shows a local memory 116, which may take a number of alternate forms such as volatile dynamic random access memory (DRAM) or non-volatile random access memory (NVRAM). The local memory 116 may be incorporated into the flash array 108, or may be located elsewhere within the device 100 such as within the I/F circuit 104 (FIG. 1). The local memory 116 is shown to store a selected portion of cached metadata.

The metadata are used to track the locations of user data stored to the flash array 108. While not limiting, it will be contemplated that the user data are arranged as fixed sized blocks of user data that are uniquely identified by logical block addresses (LBAs). Other forms of logical addressing may be used, so the use of LBAs is merely exemplary and not limiting. The metadata may be appended to each erasure block 110, or may be stored separately in specially denoted erasure blocks such as at 118, or may occupy regular mapping units which are not mapped to logical block addresses, or some combination of these locations.

In the exemplary system 100, host read requests are issued in terms of LBAs. For example, the host may issue a read command with an identification of a selected range of LBAs to be returned to the host (e.g., "read LBAs 100-199"). The system will use the metadata to convert the logical addresses of the LBAs to physical block addresses (PBAs) indicative of the physical location where the associated data are stored. The physical block addresses may be expressed in terms of a particular GCU, block, page, bit offset, etc. sufficient to identify the physical location of the user data. The system will then retrieve the user data from the identified physical location and transfer the data to the host.

It is contemplated that the local memory 116 will not have sufficient storage capacity to retain a copy of all of the metadata in the system at a given time. Hence, memory access and swap operations may take place in the background to move the appropriate metadata from the flash array 108 to the local memory 116 on an as-needed basis. Suitable metadata tables and other data structures can be used to facilitate such operations.

Host write requests are also issued in terms of LBAs (e.g., "write LBAs 100-199"). The host will supply a write command and the associated user data to be written. The system will process and write the user data to a suitable location within the flash array 108, such as the next available page(s) in the most recently allocated GCU. Metadata will be generated and stored to describe the location and status of the written data.

Figure 3:
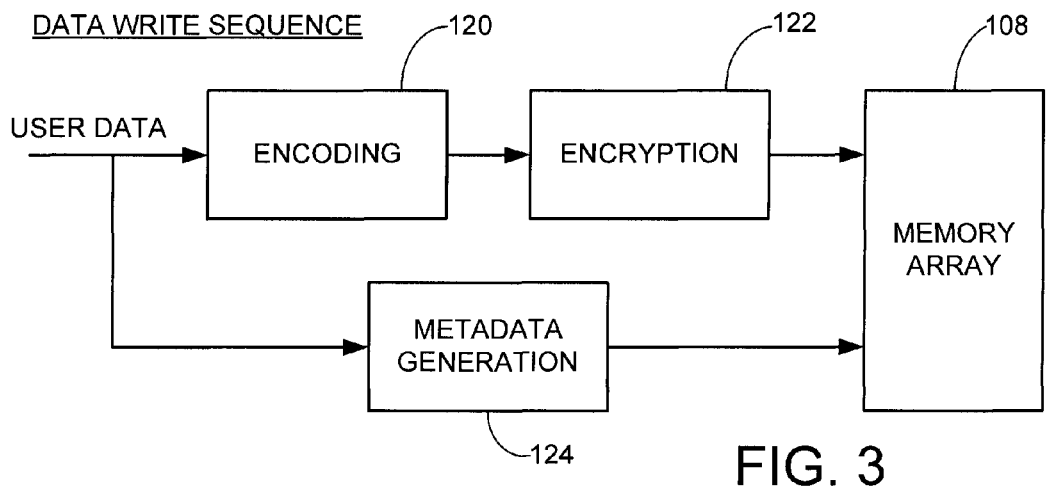
FIG. 3 is an exemplary write sequence.

FIG. 3 illustrates an exemplary data write sequence in accordance with some embodiments. Input user data may be subjected to an encoding operation by encoding block 120. This encoding may take a variety of forms, such as the use of error correction codes (ECC), data compression, etc. The encoded data may thereafter be encrypted by an encryption block 122. A variety of encryption approaches may be utilized, including multi-level encryption. The encrypted data are thereafter stored in an appropriate location in the memory array 108 by the application of appropriate write signals.

As desired, a read-write-verify operation can be carried out to ensure the data are correctly written to the array. Writeback caching may also be employed so that the device temporarily caches the user data and immediately informs the host that the data have been written, and then schedules the actual writing of the data at a subsequent time.

A metadata generator block 124 concurrently operates to generate appropriate metadata associated with the encoded, encrypted user data. The metadata are stored in an appropriate location within the memory array 108 or other suitable location within the device 100.

Figure 4:
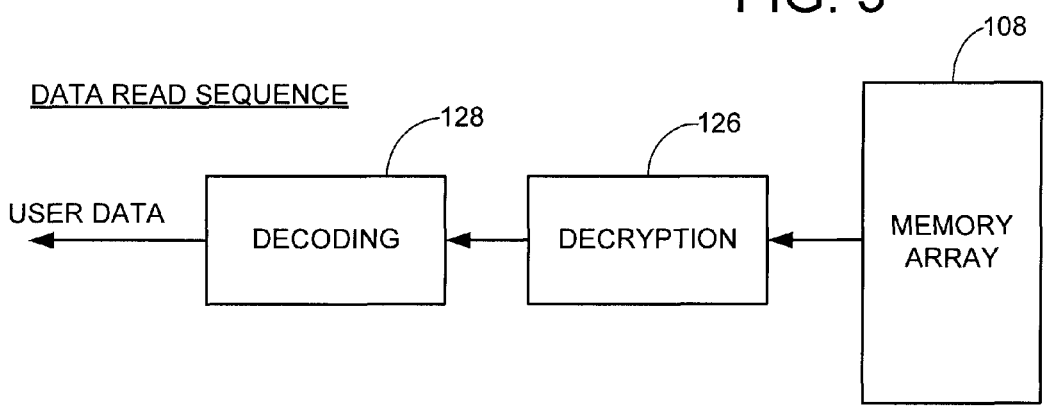
FIG. 4 is an exemplary read sequence.

FIG. 4 illustrates an exemplary data read sequence to subsequently return user data to the host stored by the sequence in FIG. 3. Although not specifically depicted in FIG. 4, it will be understood that the read sequence includes accessing of the pertinent metadata to locate the physical location of the stored user data in the array 108. Appropriate signals are applied to read out the stored data. A decryption block 126 applies decryption to the recovered readback data, and a decoding block 128 applies appropriate decoding steps (e.g., error correction, data expansion). The recovered user data are thereafter returned to the host.

Generally, it will be appreciated that the processing of a read command may include various control operations such as a decoding operation upon the received command, the use of metadata from the system to identify the physical location of the requested data from the array, the reading out of the data from the physical location such as by strobing the locations with different applied gate voltages to detect the programmed states of the associated cells, the transfer of the data to a local cache, the application of decoding operations (error correction, decryption, etc.), and then the transfer of the requested data to the host.

As noted above, a mapping unit of flash memory cells generally cannot be overwritten with new data but instead require an erasure operation (at the erasure block level) before new data can be written to the unit. Each time a new set of data are written to the memory array for a given logical address (e.g., a particular set of LBAs), the data will generally be written to a new physical location. This is due to common design constraints of flash based non-volatile memory; data cannot generally be overwritten, and can only be erased in relatively large erase blocks. If multiple copies of a particular data set are present in the array 108, including a most current copy and older, stale versions of the data, then ideally the metadata control system will operate to ensure that the older, stale versions of the data are ignored and only the most current copy of the data is returned. However, the stale versions could be found by an attacker by examining the non-volatile memory separated from its controller. These stale copies can represent security risks to the confidentiality of the data and to the actions of the user and/or the operating system, software applications, etc.

Figure 5:
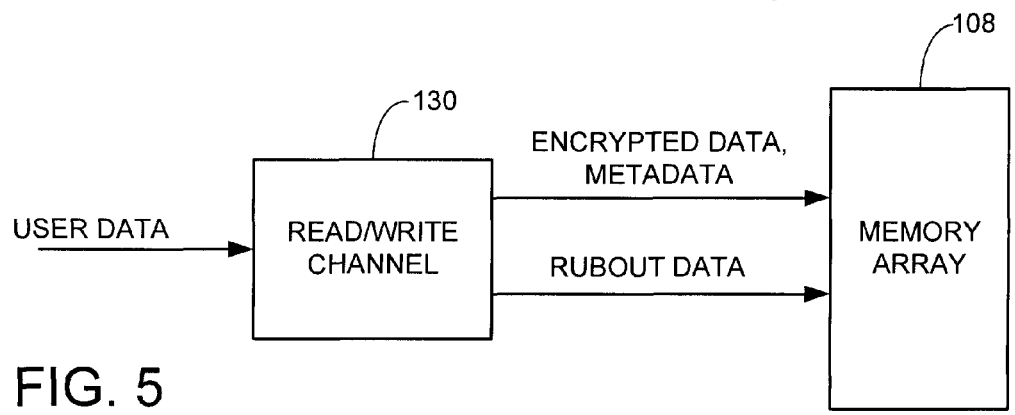
FIG. 5 shows the concurrent writing of rubout data during a data write operation.

Various embodiments of the present invention generally operate to write new data to the array 108 in such a way that older, stale versions of the data are concurrently removed (overwritten) from the system. As shown in FIG. 5, newly received write data are presented to a read/write (R/W) channel 130 of the device 100 during a write operation. The R/W channel 130 operates to both process the newly presented data for writing to the array 108, and to provide rubout data so that an older copy of the data is removed from the array. This processing can be carried out in a variety of ways.

In some embodiments, the older copy of data is located and overwritten with selected rubout data, such as all logical zeros (0's). Other data overwriting schemes are contemplated, such as the application of bit-inverted data. Generally, the erasure of data blocks in an erasable memory such as flash is avoided at the time of writing new data because such erasures would affect relatively large erase blocks which could store live (current version) data. Such data would need to be relocated to another, empty location in another erase block, which would be time intensive and would tend to increase wear on the memory. The overwriting of the stale copy or copies of the data is instead accomplished by adding charge to the floating gates (in the context of a flash memory).

It is contemplated, although not necessarily required, that this processing will be applied each time write data are provided to the device. In this way, there will generally only be a single copy of any particular set of data in the device at a given time. This can provide a number of benefits, such as improved security and less information leakage.

Figure 6:
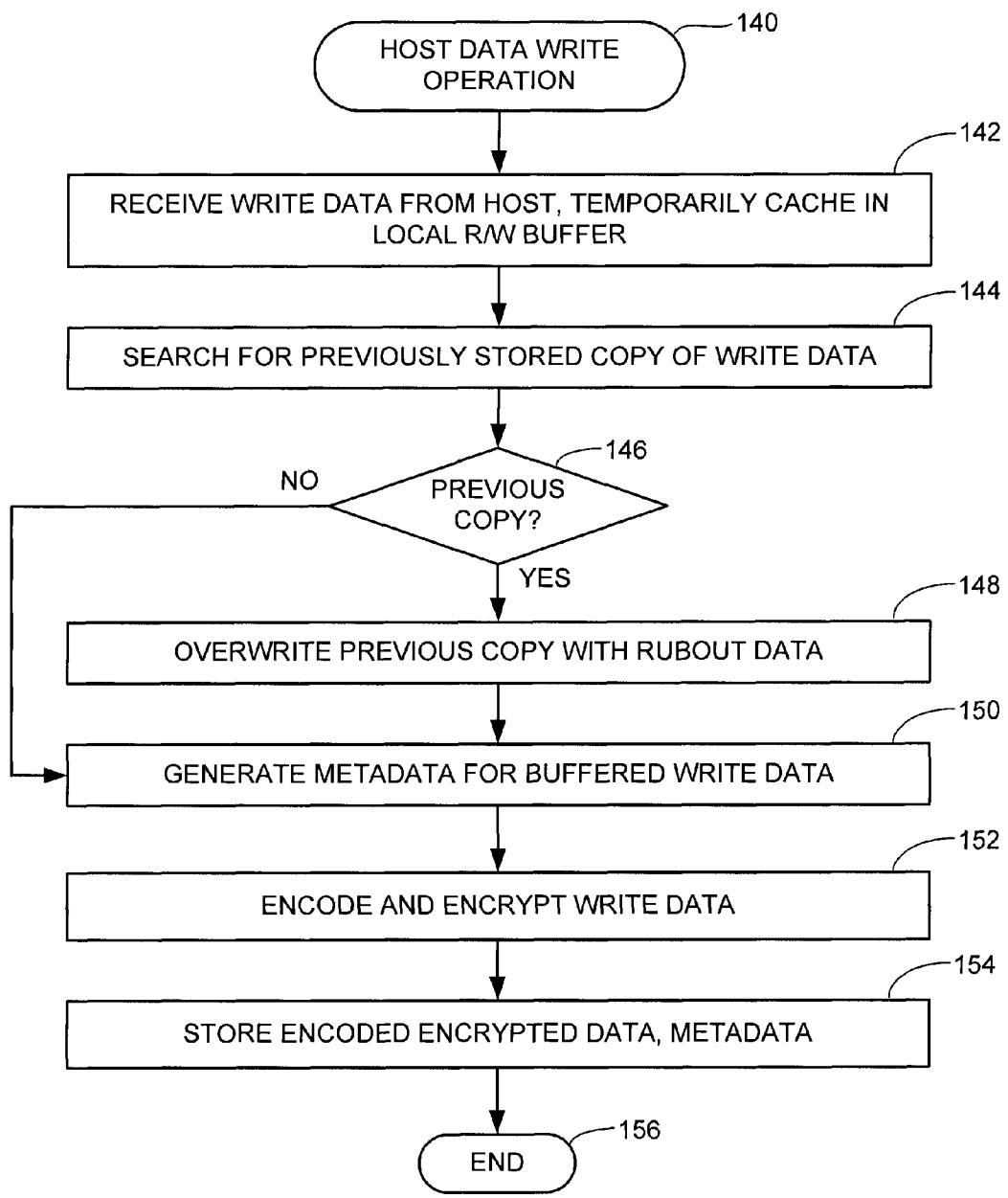
FIG. 6 is a flowchart for a DATA WRITE routine.

FIG. 6 provides a flow chart for a HOST DATA WRITE OPERATION routine 140, generally representative of steps that may be carried out in accordance with various embodiments of the present invention. While not limiting, the routine 140 may represent programming used by the controller 101 (FIG. 1) to process write commands from the host. It will be appreciated that the routine is merely exemplary and other steps, as well as a different ordering of the listed steps, can be used as desired depending on the requirements of a given application.

At step 142, write data received from the host are temporarily stored in a suitable location, such as a local buffer accessible by the R/W channel 130 (FIG. 5). The input data, referred to herein as a newer copy of the data, may have an associated logical address, such as a selected range of LBAs associated therewith. A test is commenced at step 144 to determine whether the LBA has not been mapped yet to physical locations, that is, whether its current content has to be erased. This may involve an accessing of the metadata stored in the system, or by referencing some other structure such as an LBA lookup table.

If a previous copy of the data is located, as indicated by decision step 146, the routine continues to step 148 wherein the previous copy of the write data is overwritten. While not required, the metadata system may be updated at this time to signify this processing.

The routine continues at step 150 to generate appropriate metadata for the buffered write data. The buffered write data is next subjected to appropriate pre-write processing, such as encoding and encryption at step 152, after which the processed data are written to the memory array 108 at step 154. The process then ends at step 156, although it will be appreciated that additional steps may also be taken, such as a read-write-verify operation, host notifications, etc.

Benefits associated with the data rubout processing of FIG. 6 in the context of a flash memory array can be understood with reference to FIG. 7, which illustrates a number of flash memory cells 200. The memory cells are arranged in a NAND configuration and include localized doped regions 202 in a semiconductor substrate 204. A gate structure 206 is provided between each adjacent pair of the doped regions 242 so that each cell takes a general nMOS-FET configuration.

Each gate structure 206 includes a floating gate (FG) 208, a control gate (CG) 210 and intervening isolation regions 212, 214. Data are stored by accumulating charge on the floating gate 218. The presence of accumulated charge raises the threshold voltage required on the control gate 220 place the cell in a drain-source conductive state across channel CH. A separate erasure operation is required to remove accumulated charge from the floating gate.

The cells can be configured as multi-level cells (MLC) through the storage of multiple states. For example, four different levels of accumulated charge (from substantially no charge to a maximum level of charge) can be used to enable each MLC to store 2 bits of data (e.g., 11, 10, 01, 00). Due to the need to carry out a separate erasure operation to remove the storage state of previously programmed cells, it will readily apparent that the data overwrite operation can be used to bring the floating gates of the associated cells to the maximum level of charge (e.g., writing each MLC to the state "00"). Similarly, single level cells (SLCs) that store a single bit in each cell (e.g., a 1 or 0) can be overwritten to bring the floating gates to the maximum level of charge (e.g., writing each SLC to the state "0"). However, in some existing flash memory architectures, the two stored bits belong to two different LBAs, and overwriting the cell with 00 destroys the information in both the intended LBA and in another one. Therefore, MLC devices may require different processing to take this into account.

It will be appreciated that programming a flash cell involves moving trapped charge onto the floating gate of the cell. Erasing removes all charge from the floating gate. To rubout a cell programmed state in accordance with the present discussion, the flash controller operates to increase the amount of trapped charge. As noted above, this could potentially affect other bits stored in MLC configured cells.

If all encoded bits in a cell require rubout, moving the charge level to a maximum level serves to purge both bits (in a two-bit MLC). Otherwise, there may be two charge levels which do not alter the other stored bits. The rubout process can thus be performed to move the trapped charge level to the higher of these two levels. Depending on the bits-to-charge encoding, the outcome for rubbing out a 4-level (2 bit) MLC can be a constant value, the other bit, or its inverse. If the other bit is used, data duplication occurs (that is, the rubbed out bit mirrors the other bit stored in the MLC cell).

Accordingly, rubout of an MLC in accordance with the present discussion may include performing an extra check to see if any remaining bit of the MLC is mapped to live (non-rubbed out) data. If not, the floating gate can simply be driven to maximum charge. If so, the charge level of the MLC is increased to the higher of the two allowable levels.

It will now be appreciated that the foregoing technique operates to overwrite individual flash memory cells, or relatively small pages or other groups of cells, with all zero bits (or some other overwrite value) by applying charge to the floating gates of the flash cells involved, without first erasing them. This is a good security measure, because as a background activity, the wear leveling, or the data access optimization process of flash memory controllers constantly copies some data to new locations in the flash memory. The data in the old location is not needed or used any more, but it could leak information to an attacker, who reads the flash content with inexpensive direct ways (just addressing the location and reading out the response signal from the controller electronics).

A further security problem can arise in some instances where unequal sized data blocks are arranged in the vicinity of equal data blocks. These variations could in some cases reveal "small" data changes in storage blocks, which an attacker may be able to undo by simply swapping the unequal blocks.

Accordingly, the controller logic operates to overwrite the unneeded, old memory locations with all "0" bits (or other value) when the content becomes obsolete. This way, at no time can an attacker practically find multiple copies of the data stored for a given logical block. Even if the blocks are encrypted, the number and location of equal blocks may reveal usage patterns, and the recent activity of the user. At certain encryption modes, such as ECB or CBC with predictable IV, repeating data patterns may also be found.

The overwriting method can be performed on much smaller sized blocks (e.g., at the page level, etc.) than at the larger erasure block level, and the method does not necessarily require data to be copied or relocated. This provides faster response and less wear.

There is further little need for the application of high voltage to the chip substrate as normally used during erase operations, and this can further tend to reduce wear of the flash memory. Information leakage to an attacker is also reduced.

The methodology disclosed herein is complementary to cryptographic means of data leak prevention, such as through the use of randomized ciphers so that copies of ciphertext at different physical locations in the memory are encrypted differently. In some physical flash architectures, expensive invasive hardware (HW) attacks might still be able to recover some of the overwritten data by measuring remnant charges in the floating gates, even after repeated rubout applications. Nevertheless, this technique can be a valuable stand-alone or complementary security measure to protect against information leakage.

While the foregoing embodiments have been directed to flash memory cells, it will be appreciated that the data rubout processing discussed above can be readily adapted for other types of memory. FIG. 8 shows a disc memory 230 adapted to store data in the form of magnetization transitions along concentric tracks 232 defined on the disc recording surface. A moveable actuator 234 is used to align a data read/write transducer 236 with the respective tracks to read data from and write data to the tracks.

In some embodiments, the tracks are divided up into a number of concentric zones, with each zone having an associated band key that is incorporated in the encryption processing of all the data stored in that zone. Hence, one alternative approach is to write each new copy of a particular data set to a different zone, thereby providing each copy with a different band key. Such band-based processing can be similarly applied to other forms of memory including the flash memory array discussed above.

FIG. 9 shows another memory configuration in which the data rubout processing set forth herein can be readily implemented. The memory is formed from an array of spin-torque transfer random access memory (STRAM) cells 240. Each memory cell comprises a magnetic tunneling junction 242 with a variable magnetization free layer 244, a fixed magnetization reference layer 246, and an intervening barrier layer 248. The MTJ 242 is in series with a switching device 250, characterized as an nMOSFET.

Data are stored by the MTJ 242 in relation to the orientation of the free layer 244 relative to the reference layer 246. Generally, the MTJ 242 may exhibit a lower relative electrical resistance in a parallel state, and a higher electrical resistance in an antiparallel state. The programmed state of the cell 240 can be sensed in relation to a voltage drop across the cell responsive to a low magnitude read current.

FIG. 10 sets forth another memory configuration in which the disclosed data rubout methodology can be used. The memory constitutes an array of resistive random access memory (RRAM) cells 260. Each cell has a programmable resistive element 262 formed from opposing electrodes 264, 266 and an intervening oxide layer 268. A filament 270 can be selectively formed across the oxide layer (and subsequently removed) to alter the overall resistance of the memory cell 260. As before, the element 260 can be placed in series with a switching device 250 to provide selective access to the individual cells.

It will be appreciated that the various embodiments of the present invention can provide benefits over the existing art. Overwriting previous copies each time new copies of data are written can help ensure that only the most current revision data will generally be present in the array. This can produce a number of benefits, including faster I/O rates, simplified metadata management, and enhanced data security.

While a variety of types and styles of memories have been disclosed, such are merely exemplary as the various techniques set forth herein can be adapted to a wide variety of applications and environments Nothing disclosed in the foregoing illustrative embodiments is intended or contemplated as being essential for implementation or limiting to the scope of the claimed subject matter.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   receiving a host write command from a host device to write a newer copy of user data to a non-volatile memory;
   temporarily storing the newer copy of the user data in a local buffer;
   searching the non-volatile memory to locate an older, previously stored copy of the user data; and
   servicing the host write command by transferring the newer copy of user data from the local buffer to a first selected empty physical location in the non-volatile memory and by concurrently overwriting rubout data onto the older, previously stored copy of the user data stored to a different, second selected occupied physical location in the non-volatile memory, wherein the rubout data are not subsequently erased from the different, second selected occupied physical location in the non-volatile memory during the servicing of the host write command, the different, second physical location comprising a plurality of multi-level cells (MLCs) each adapted to store multiple bits, with a first bit in each MLC in the different, second physical location forming a portion of the older, previously stored copy of the user data and a second bit in each MLC in the different, second physical location forming a portion of a different, second set of user data, the rubout data overwritten by selectively adding charge to the MLCs to alter the bits in the older, previously stored copy of the user data without affecting the bits in the second set of user data.

2. The method of claim 1, wherein the newer copy of user data is a latest version of a data block having a selected logical address, and the newer copy is the only copy of the user data having the selected logical address in the memory at a conclusion of the servicing of the host write command.

3. The method of claim 1, further comprising forwarding a command complete status to the host device to signify completion of the servicing of the host write command, and subsequently performing a garbage collection operation to erase the rubout data from the different, second physical location in the non-volatile memory.

4. The method of claim 1, in which the first and second selected locations are disposed in different erasure blocks of a flash memory array, and the older, previously stored copy of the user data is overwritten in such a way that at least two flash memory cells in the second selected location are overwritten so as to store a maximum amount of charge therein.

5. The method of claim 1, in which the older, previously stored copy of the user data is encrypted using a first encryption key and the newer copy is encrypted using a different, second encryption key, and the servicing step further comprises purging the first encryption key from the memory.

6. The method of claim 1, wherein the local buffer is a local volatile memory coupled to the non-volatile memory and the non-volatile memory is a flash memory.

7. The method of claim 1, in which the servicing of the host write command comprises adding charge to floating gates of the memory cells in the second selected location without removing any charge from said floating gates during the servicing of the host write command.

8. The method of claim 1, in which the servicing step comprises generating metadata associated with the storage of the newer copy of the user data in the first selected location, and storing said metadata in a memory.

9. The method of claim 1, in which the searching step locates a second older, previously stored copy of the user data stored in a different, third selected location in the non-volatile memory, and the servicing step further comprises concurrently overwriting second older, previously stored copy of said user data with second rubout data without subsequently erasing the second rubout data prior to completion of the servicing of the host write command.

10. An apparatus comprising:
a non-volatile memory which stores an older copy of user data in a first selected location; and
a control circuit which, responsive to receipt of a host write command from a host device to write a newer copy of the user data to the non-volatile memory, temporarily stores the newer copy of the user data in a local buffer, searches the non-volatile memory to locate an older, previously stored copy of the user data, and transfers the newer copy of the user data from the local buffer to a second selected empty physical location in the non-volatile memory and concurrently overwrites rubout data onto the older, previously stored copy of the user data in the first selected location without performing an associated erasure of the rubout data during the servicing of the host write command, the first selected location configured as a plurality of multi-level cells (MLCs) each having a multi-bit programming state so that a first bit of each MLC corresponds to a bit value of the older, previously stored copy of the user data and a second bit of each MLC corresponds to a bit value of a second set of user data, the overwriting of the rubout data onto the older, previously stored copy of the user data comprising selectively adding charge to the MLCs so that the MLCs have new multi-bit programming states that still correspond to the bit values of the second set of data.

11. The apparatus of claim 10, in which control circuit accesses metadata to identify the first selected location in which the older copy of the user data is stored, generates second metadata which identifies the second selected location in which the newer copy of user data is stored, and stores the second metadata in the memory.

12. The apparatus of claim 10, the control circuit further adapted to transmit a write complete status to the host device to signify completion of the host write command after the writing of the rubout data to the first selected location and after the writing of the newer copy of the user data to the second selected location, the control circuit further adapted to erase the rubout data from the first selected location after the transmission of the write complete status.

13. The apparatus of claim 10, in which the control circuit subsequently directs an erasure of each memory cell in the first selected location to remove accumulated charge from the memory cells in the first selected location and to place the memory cells in the first selected location in condition to store new data responsive to a subsequent host write command.

14. The apparatus of claim 10, in which the non-volatile memory is characterized as a flash memory array arranged as a plurality of erasure blocks, the first selected location disposed within a first erasure block of said plurality, the second selected location disposed in a different, second erasure block of said plurality, and the control circuit subsequently schedules a garbage collection operation upon a garbage collection unit that includes the first erasure block independently of the servicing of the host write command.

15. The apparatus of claim 10, in which the control circuit further operates to generate metadata associated with the storage of the newer copy of the user data in the second selected location, and directs the storage of said metadata in a memory.

16. A data storage device, comprising:
a flash memory array having a first selected location that comprises a plurality of multi-level cells (MLCs) each having a multi-bit programmed state where a first bit of the multi-bit programmed state of each MLC corresponds to a bit value in an older, previously stored copy of user data and a second bit of the multi-bit programmed state of each MLC corresponds to a bit value of a second set of user data; and
a controller adapted to, responsive to a host write command received from a host device to write a newer copy of the user data to the flash memory, direct a storage of a newer copy of the user data associated with the received host write command in a local buffer, direct a search of the flash memory array for the older copy of the user data, and to direct a transfer of the newer copy of the user data from the local buffer to a second selected empty physical location in the flash memory array, wherein the controller is further adapted to, responsive to the host write command, to direct a concurrent overwrite of the older copy of the user data with rubout data in the first selected location without an associated erasure of the first selected location , the concurrent overwrite selectively adding charge to the MLCs so that the first bit of the multi-bit programmed state of each MLC corresponds to a bit value in the rubout data and the second bit of the multi-bit programmed state of each MLC corresponds to a bit value in the second set of user data.

17. The data storage device of claim 16, further comprising a metadata generation block which generates metadata associated with the newer copy of the user data associated with the second selected location and which directs a storage of said metadata in the flash memory array.

18. The data storage device of claim 16, in which the older copy and the newer copy share at least one common host level logical block address (LBA), and at a conclusion of the servicing of the host write command by the controller, the new copy is the only copy of data in the memory with the host level LBA.

19. The data storage device of claim 16, in which the controller subsequently schedules a garbage collection operation to remove the accumulated charge from the MLCs in the first selected location.

* * * * *